(12) United States Patent
Debalme et al.

(10) Patent No.: US 6,673,294 B2
(45) Date of Patent: Jan. 6, 2004

(54) METHOD FOR SEALING A BARED SECTION OF THE WALL OF A HOLLOW BODY MADE OF A COMPOSITE BASED ON A REINFORCED THERMOPLASTIC

(75) Inventors: Jean-Paul Debalme, Chambery (FR); Gilles Rocher, Chambery (FR); Jacques Voiron, St Jean de Couz (FR)

(73) Assignee: Saint-Gobain Vetrotex France S.A., Chambery (FR)

( * ) Notice: Subject to any disclaimer, the term of this patent is extended or adjusted under 35 U.S.C. 154(b) by 132 days.

(21) Appl. No.: 09/813,029

(22) Filed: Mar. 21, 2001

(65) Prior Publication Data

US 2002/0014304 A1 Feb. 7, 2002

(30) Foreign Application Priority Data

Mar. 21, 2000 (FR) .............................. 00 03577

(51) Int. Cl.$^7$ .................. B05D 1/00; B29C 31/00; B29C 65/40; F16L 9/12
(52) U.S. Cl. .................. 264/259; 138/109; 156/308.2; 156/309.6; 156/309.9; 222/1; 427/401
(58) Field of Search ................. 156/82, 304.6, 156/608.2, 309.9, 322, 797, 267, 309.6; 118/271, 302, DIG. 2; 222/146.2, 146.5, 1; 264/248, 259; 138/109; 427/401

(56) References Cited

U.S. PATENT DOCUMENTS

| | | | |
|---|---|---|---|
| 2,220,545 A | * | 11/1940 | Reinhardt |
| 2,372,737 A | * | 4/1945 | Phillips |
| 2,722,964 A | * | 11/1955 | Duncan |
| 2,839,441 A | * | 6/1958 | Kent |
| RE24,801 E | * | 3/1960 | Kaminsky |
| 3,607,570 A | * | 9/1971 | Hildebrandt |
| 3,658,627 A | * | 4/1972 | Kaminsky |
| 3,839,126 A | * | 10/1974 | Haller |
| 3,853,669 A | * | 12/1974 | Werstlein |
| 4,010,054 A | * | 3/1977 | Bradt |
| 4,526,287 A | | 7/1985 | Miyamatsu et al. |
| 5,150,812 A | * | 9/1992 | Adams et al. |
| 5,223,189 A | | 6/1993 | Friedrich |
| 5,358,994 A | * | 10/1994 | Mallow |
| 5,370,319 A | * | 12/1994 | Schlegel |
| 5,887,743 A | | 3/1999 | Stahlecker et al. |
| 6,022,435 A | | 2/2000 | Palazzo |
| 6,065,888 A | * | 5/2000 | Maayeh |

FOREIGN PATENT DOCUMENTS

| | | |
|---|---|---|
| DE | 2 102 001 | 8/1972 |
| DE | 221 965 | 5/1985 |
| DE | 221 966 | 5/1985 |
| DE | 34 26 246 | 1/1986 |
| EP | 356588 * | 3/1990 |
| EP | 0 640 727 | 3/1995 |
| FR | 2 049 784 | 3/1971 |
| FR | 2 157 097 | 6/1973 |
| FR | 2728051 * | 6/1996 |
| GB | 1 227 975 | 4/1971 |
| JP | 60-20336 | 2/1985 |
| JP | 60-184793 * | 9/1985 |
| WO | WO 00/24566 * | 5/2000 |

OTHER PUBLICATIONS

Abstract for French 2049784.*
Abstract for German 3426246.*
Abstract for German 221966.*
Abstract for German 221965.*
Abstract for German 2102001.*

* cited by examiner

*Primary Examiner*—Steven D. Maki
(74) *Attorney, Agent, or Firm*—Oblon, Spivak, McClelland, Maier & Neustadt, P.C.

(57) ABSTRACT

Method for sealing a bared section (10) in the wall of a hollow body based on a thermoplastic and on reinforcing fibers, the hollow body being especially intended for conveying or containing a pressurized fluid. The surface and the contours of the section (10) are coated with a protective thermoplastic (30) which is heated while it is being deposited and is compatible with the said thermoplastic of the hollow body in order to achieve complete adhesion.

4 Claims, 1 Drawing Sheet

METHOD FOR SEALING A BARED SECTION OF THE WALL OF A HOLLOW BODY MADE OF A COMPOSITE BASED ON A REINFORCED THERMOPLASTIC

The invention relates to the sealing of a bared section of the wall of a hollow body made of a composite based on a thermoplastic and reinforcing fibres, for example glass fibres.

The invention will be more particularly described in the case of hollow bodies of the type such as pipes intended to convey pressurized fluids. However, it is not limited to this application and may, for example, relate to pressurized tanks containing pressurized fluids.

To convey pressurized fluids, it is known to use pipes made of a reinforced thermoplastic, which pipes have the advantage, while being just as strong, of being lighter than pipes made of cast iron or cement, or even pipes made only of thermoplastic.

This type of pipe, like that described in French Patent Application FR 98/13293 consists of a matrix made of a thermoplastic, for example polyethylene, a matrix-encapsulating layer based on reinforcing fibres advantageously mixed into a thermoplastic identical to that of the matrix, and a thermoplastic coating covering the encapsulating layer and preferably identical to the material of the matrix.

Two pipes of the aforementioned type are joined together by means of joining devices which necessarily have a sealing system for sealing the end faces of the pipes to be butted together.

French Patent Applications FR 2728051 and FR 00/00073 disclose joining devices for which a seal intended to be firmly applied against the facing end faces of the two pipes is provided.

However, in this case the sealing of the end face of a pipe is achieved only when making a joint. Now, before making such a joint, the pipes after manufacture may remain stored without any sealing protection being applied to them and are this liable to be attacked by external agents.

In the situation in which the bared end faces of a pipe have not been protected and are exposed to high compressive forces by water or by a fluid, the pressurized water or fluid may, over time, seep into the encapsulating layer along the reinforcing fibres. This may cause internal failure of the thermoplastic, possibly resulting in blisters visible on the external surface of the pipe; the mechanical strength of the pipe can therefore no longer be guaranteed.

We described above the problem of sealing the bared end faces of a pipe, but the same problem arises when a cut is made through the wall of the pipe for the purpose, for example, of tapping off another pipe.

Moreover, as a precaution, it may be desirable even if a sealed connection has to be made at the end face of a pipe or of any cut, to seal the internal material of which the pipe is composed, particularly the reinforcing fibres which in no case must come into contact with the fluid conveyed, in order to avoid any risk of contamination and to satisfy food criteria.

An object of the invention is therefore to seal the free openings of a hollow body based on a thermoplastic and reinforcing fibres, or any cut in the wall which bares the internal composition of which the hollow body is composed.

According to the invention, several alternative ways of implementing the method for producing the seal may be envisaged depending on the dimensions of the cross-section and its location in the hollow body.

The method for sealing a bared section in the wall of a hollow body based on a thermoplastic and on reinforcing fibres, the hollow body being especially intended for conveying or containing a pressurized fluid, the surface and the contours of the section being coated with a protective thermoplastic which is heated while it is being deposited and is compatible with the said thermoplastic of the hollow body in order to achieve complete adhesion, is characterized in that the protective thermoplastic is deposited in the form of an approximately flat bead of material which is largely melted using a heat gun.

According to another way of implementation, the method is characterized in that the protective thermoplastic is, for the purpose of depositing it, in the form of a piece which perfectly matches its surface and its contours. This piece may be deposited using a heating tool capable of sitting over the surface and the external edge of the section, such as an annular bell, which makes it possible to bring about a reduction in the diameter of the section.

According to yet another way of implementing the method, the protective thermoplastic consists of the external coating made of a thermoplastic of a second hollow body partly intended to be housed in the said section when the main hollow body has to be tapped off by means of the second hollow body.

According to one characteristic, the section is preheated before the protective plastic is deposited.

According to another characteristic, pressure is exerted on the surface and the contours of the section during or after deposition of the protective thermoplastic. The protective thermoplastic will be deflashed after it has cooled, so as to make the sealed section neat.

The method of the invention may especially be applied to a hollow body which advantageously consists of a matrix made of a thermoplastic, an encapsulating layer made of a thermoplastic in which glass fibres are mixed, and a coating made of a thermoplastic, the thermoplastic of the matrix preferably being identical to those of the encapsulating layer and the coating, and to the protective thermoplastic.

Further features and advantages of the invention will now be described in relation to the appended drawings in which:

FIG. 1 shows a sectional view of a section 10 along the end face of a pipe based on a thermoplastic reinforced with fibres, particularly glass fibres.

The wall 20 of the pipe comprises a matrix 21 made of a thermoplastic of the polyethylene or polypropylene type, an encapsulating layer 22 made of a thermoplastic reinforced with glass fibres, such as TWINTEX® sold by VETROTEX, and a coating 23 over the encapsulating layer, made of a thermoplastic preferably identical to that of the matrix 21.

Figure 1:
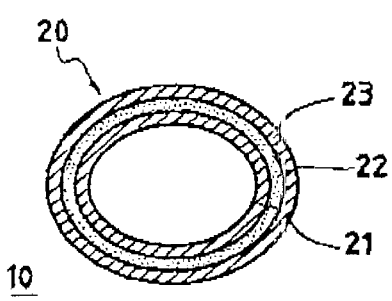
FIG. 1 is a sectional view of a cut section of a pipe along its end face.
Figure 2:
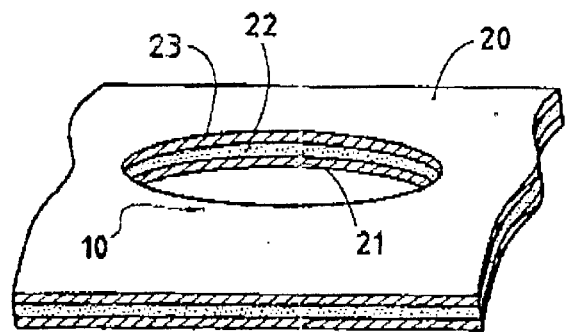
FIG. 2 is a sectional and end view of a section cut out in the wall of a pipe.

The section 10 along the end face of the pipe, but which could just as well be made in the thickness of the wall of the pipe as shown in FIG. 2, bares the matrix 21, the encapsulating layer 22 and the coating 23.

It is therefore essential to seal the cut in order to prevent any risk of pressurized fluid seeping into the encapsulating layer 22 along the reinforcing fibres, which could damage the pipe by internal failure initiators and would no longer guarantee thee mechanical strength of the pipe.

Moreover, the encapsulating layer 22 containing glass fibres must not come into contact with the fluid intended to be conveyed in the pipe in order to avoid any risk of contamination and thus to meet the food criteria with which the pipe must comply.

For this purpose, an object of the method of the invention is to cover the surface and the contours of the section 10 with a protective thermoplastic 30.

The protective thermoplastic 30 is bonded to the thermoplastic of the pipe in order to form material continuity. The bonding takes place by hot welding the two thermoplastics together, these necessarily being compatible so that after softening they can substantially blend together, and ensure their mutual adhesion after cooling. Preferably, the same material as that of the pipe will be chosen for the protective thermoplastic 30.

The first step of the method consists in preheating thin surface and the contours of the section 10 for the purpose of softening the thermoplastic of the pipe. It is then possible to apply the protective thermoplastic 30, which is also heated, so as to deposit it in the softened state.

After the thermoplastic 30 has been deposited or simultaneously with the deposition, depending on the method of implementation chosen as regards the presentation of the thermoplastic, as we will see below, pressure is applied to the surface and to the contours of the section coated with the protective material so as to ensure that it adheres perfectly.

After welding, a deflashing operation is carried out so as to remove the surplus thermoplastic and to make the sealed section neat.

Several ways of implementation may be envisaged for depositing the protective thermoplastic 30. The choice of implementation method will essentially depend on the type of section cut, which may vary in size and be formed along the end face of the pipe or else through the wall.

Figure 3:
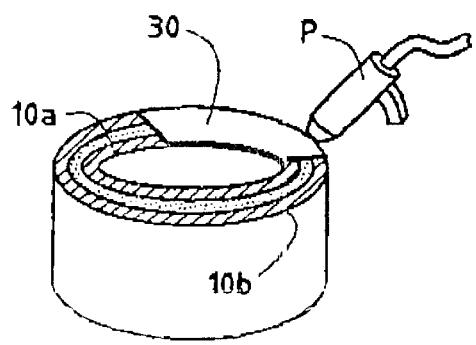
FIG. 3 illustrates a top and end view of FIG. 1, showing the deposition of the protective thermoplastic according to a way of implementing the method of the invention.

In a first method of implementation (FIG. 3), particularly for sealing a section along the end face of the pipe, the thermoplastic is in the form of a bead of substantially molten material. This bead is delivered by a heating tool which is simple to use and suitable for easily placing the bead over the surface of the section and the contours of the section, that is to say by making it extend beyond the internal and external walls of the pipe so as to completely cover the internal edge 10a and external edge 10b of the section. The tool, as illustrated in FIG. 3, is, for example, a heat gun P into which a rigid stick of thermoplastic is introduced, the exiting end of the material of which is flat in shape so as to flatten against the section, simultaneously with its deposition, the then substantially flat bead of thermoplastic.

Thus, the present invention provides, but is not limited to, a method for sealing a bared section in a wall of a hollow body for conveying or containing a pressurized fluid having a matrix, an encapsulating layer, and a coating, the matrix including a first thermoplastic, the encapsulating layer including a second thermoplastic in which glass fibers are mixed, and the coating including a third thermoplastic. The method includes, but is not limited to, melting a protective thermoplastic with a heat gun to form a liquid protective thermoplastic, and depositing the liquid protective thermoplastic on a surface of the bared section in the form of an approximately flat bead to achieve adhesion between the liquid protective thermoplastic and at least one of the first, second, and third thermoplastics of the hollow body.

In another method of implementation, a piece 40 made of a thermoplastic having the shape and size suitable for the cut section, such as a washer, is used in order to perfectly match the contours of the said section.

Figure 4:
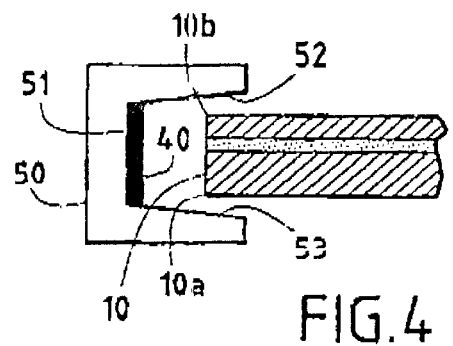
FIG. 4 illustrates a sectional view of the deposition of the protective thermoplastic according to another way of implementing the method of the invention.

When such a washer is used for a section obtained along the end face of the pipe, its dimensions reproducing the surface of the section to be covered, it is applied by means of a heating tool 50 in the form of an annular bell suitable for sitting over the section 10. FIG. 4 illustrates the tool in a sectional view, capable of sitting over the thickness of the pipe.

The bottom 51 of the bell has a groove which takes the washer 40 intended to be seated by pressure on the section, while the walls 52, 53 of this bell are intended to be pressed against the internal and external walls, respectively, of the pipe in order to cover the internal edge 10a and external edge 10b of the section.

The heat transmitted to the external thermoplastic wall of the pipe must be sufficient to deform the edges 10a and 10b of the section towards the inside of the pipe in order to reduce the diameter of the said section, so that the washer 40 applied against the said section can cover its surface and its internal and external edges by slightly extending beyond each side of the wills of the pipe.

After bonding, the bell is withdrawn without requiring cooling, its internal surface advantageously being a non-stick surface, for example based on TEFLON®. In this method of implementation, no deflashing is carried out.

Figure 5:
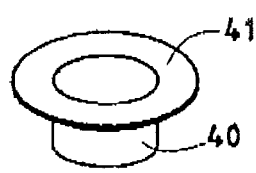
FIG. 5 shows the protective thermoplastic in the form of a washer.

In the particular case of a section 10 cut in the wall of the pipe, for example in order to make a hole for the purpose of tapping off another pipe, use is made, as nay be seen in FIG. 5, of a washer 40 which is intended to be fitted into the section and to perfectly match its contours, the washer having a height equivalent to the thickness of the wall and provided with a peripheral shoulder 41. The shoulder 41 is intended to sit over the perimeter of the cut and to rest on the external face of the wall of the pipe so that the washer remains pressed correctly against the surfaces of the cut without any risk of it falling under gravity through the hole, thereby leaving the operator's hands free. The melting and pressing operations are carried out using a cylindrical heating tool (not illustrated) which is designed to fit into the hole in the pipe and is also provided with a shoulder intended to be applied against the shoulder 41 of the washer in order to melt it with the thermoplastic of the external face of the pipe.

Figure 6:
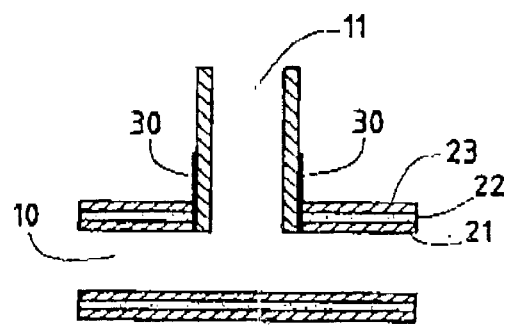
FIG. 6 is another way of implementing the method.

However, in the case of a tap-off, in which the attached pipe 11 (FIG. 6) is joined by means of socket welding, the external wall of this said attached pipe being made of a thermoplastic, the use of a washer is not essential, and the sealing around the hole made in the main pipe is obtained instead according to a third method of implementation by the actual melting of the thermoplastic of the attached pipe, which thus forms the protective thermoplastic 30.

Finally, another method of implementation (not illustrated) for adding thermoplastic 30 may consist in applying, to the surface and the edges of the cut section, a film of thermoplastic which will be heated and pressed.

What is claimed is:

1. A method for sealing a bared section in a wall of a hollow body for conveying or containing a pressurized fluid having a matrix, an encapsulating layer, and a coating, the matrix including a first thermoplastic, the encapsulating layer including a second thermoplastic in which glass fibers are mixed, and the coating including a third thermoplastic, the method comprising:

melting a protective thermoplastic with a heat gun to form a liquid protective thermoplastic;

depositing the liquid protective thermoplastic on a surface of the bared section in the form of an approximately flat bead to achieve adhesion between the liquid protective thermoplastic and at least one of the first, second, and third thermoplastics of the hollow body, wherein the protective thermoplastic and each of the first, second, and third thermoplastics comprise a same thermoplastic.

2. The method according to claim 1, further comprising:
preheating the bared section prior to depositing the liquid protective thermoplastic.

3. The method according to claim 1, further comprising:
exerting pressure on the surface during or after depositing the liquid protective thermoplastic.

4. The method according to claim 1, further comprising:
deflashing the protective thermoplastic after cooling.

* * * * *